United States Patent [19]

Barbera et al.

[11] Patent Number: 5,048,760

[45] Date of Patent: Sep. 17, 1991

[54] PROCESS FOR SELECTIVELY COMMINUTING AND PURIFYING PSYLLIUM SEED HUSK

[75] Inventors: Melvin A. Barbera, Cincinnati; Larry E. Burns, Goshen, both of Ohio

[73] Assignee: The Procter & Gamble Company, Cincinnati, Ohio

[21] Appl. No.: 610,726

[22] Filed: Nov. 8, 1990

Related U.S. Application Data

[63] Continuation of Ser. No. 496,081, Mar. 15, 1990, abandoned, which is a continuation of Ser. No. 252,640, Oct. 3, 1988, abandoned.

[51] Int. Cl.$^5$ .............................................. B02C 19/12
[52] U.S. Cl. ............................................ 241/9; 241/14; 241/24
[58] Field of Search ....................... 241/7, 11, 9, 14, 24

[56] References Cited

U.S. PATENT DOCUMENTS

| | | |
|---|---|---|
| 901,217 | 10/1908 | Touya . |
| 2,428,670 | 10/1947 | Hulse . |
| 3,219,286 | 11/1965 | Doyle et al. . |
| 4,292,890 | 10/1981 | Salete-Garces . |
| 4,583,455 | 4/1986 | Salete-Garces . |
| 4,689,229 | 8/1987 | Banik . |
| 4,813,613 | 3/1989 | Salete ................................. 241/14 |
| 5,020,732 | 6/1991 | Bahrani ............................... 241/7 |

FOREIGN PATENT DOCUMENTS

| | | |
|---|---|---|
| 144644 | 6/1985 | European Pat. Off. . |
| 242493 | 10/1987 | European Pat. Off. . |
| 3707568 | 7/1988 | Fed. Rep. of Germany . |

OTHER PUBLICATIONS

J. W. Anderson, et al., *Fed. Proc.*, 46, 877 (1987).
J. W. Anderson, et al., *Am. J. Gastroenterol.*, 81, 907–919 (1986).
S. Faberberg, *Curr. Ther. Res.*, 31, 166 (1982).
"Fluidized Bed Opposed Jet Mills AFG–Model 100–1250", Leaflet 21/lus, published by Alpine American Corporation, Natick, Massachusetts.
"Modern Stud Mills, Type Kolloplex and Contraplex Optimum Fineness–Economic Energy Consumption", Leaflet 10–11/3e, published by Alpine American Corporation Natick, Massachusetts.

*Primary Examiner*—Mark Rosenbaum
*Attorney, Agent, or Firm*—Kim William Zerby; Douglas C. Mohl; Richard C. Witte

[57] ABSTRACT

Processes for selectively comminuting impure psyllium seed husk. These processes comprise milling impure psyllium seed husk in a mill which causes the husk to be fragmented by collision under conditions whereby the mean particle size of the husk material is reduced relatively more than the mean particle size of the non-husk material. In addition, processes for purifying selectively comminuted psyllium seed husk are described.

11 Claims, No Drawings

PROCESS FOR SELECTIVELY COMMINUTING AND PURIFYING PSYLLIUM SEED HUSK

This is a continuation of application Ser. No. 496,081, filed on Mar. 15, 1990, now abandoned, which is a continuation of application Ser. No. 252,640, filed on Oct. 3, 1988, now abandoned.

BACKGROUND OF THE INVENTION

The present invention relates to processes for selectively comminuting impure psyllium seed husk. The present invention also relates to methods for purifying psyllium seed husk. Furthermore, the present invention relates to psyllium husk prepared by the processes of the present invention, and to psyllium-containing products (especially products to be mixed in liquids to form psyllium-containing drinks) comprising psyllium husk prepared by a process of the present invention.

The seed husk to be selectively comminuted by the process of the present invention is psyllium seed husk from psyllium seed, from plants of the *Plantago* genus. Various species such as *Plantaoo lanceolate. P. rugelii.* and *P. major* are known. Commercial psyllium seed husk includes the French (black; *Plantago indica*), Spanish *(P. psyllium)* and Indian (blonde; *P. ovata*). Indian (blonde) psyllium seed husk is preferred for use herein.

Products containing psyllium seed husk are used in high fiber food products and/or health care products for their benefit of normalizing bowel function and laxation. In addition, recent research has demonstrated the effectiveness of psyllium seed husk fiber in reducing human serum cholesterol levels, and in controlling blood glucose levels in diabetics. See, for example, J.W. Anderson, et al., *Fed. Proc.*, 46, 877 (1987); J.W. Anderson, et al., *Am. J. Gastroenterol.*, 81. 907-919 (1986); and S. Faberberg, *Curr. Ther. Res.*, 31. 166 (1982); all incorporated herein by reference in their entirety.

Psyllium seed husk is typically manufactured by separating the seed husk from the remainder of the seed by slight mechanical pressure, for example by crushing the seeds between rotating plates or rollers. The husk is then typlcally purified by sieving the mixture to separate the husk from the remainder of the seed parts and/or by blowing (winnowing) the husk away from the impurities. Impurity present in the psyllium husk is predominantly dark particles which are readily visually apparent amongst the blond-colored psyllium husk; and are readily perceived as being particularly gritty during ingestion. Subsequent attempts at purifying the psyllium further, for example by sieving, are generally tedious processes which produce low yields of psyllium and/or only moderately improved purity.

While the selective comminution processes of the present invention are previously unknown and unexpected, mills suitable for these processes are known. Generally, they are characterized as being mills which produce fragmentation (i.e., the "milling") of materials through collision, including particle-particle collision (e.g., fluid energy mills) and/or particle-blunt surface collision (e.g., stud mills; ball mills), rather than having the fragmentation being caused solely by a crushing action or by scissoring, screening, abrading, shearing, or slicing actions.

Such mills have been used to mill a wide variety of materials. For example, materials such as silica gel, tungsten carbide, toner, wax, resin, fat, and mica have been milled in fluidized bed opposed jet mills; and materials such as acetyl salicylic acid, bran, sesame seeds, glucose, grains, and copper oxychloride have been milled in stud mills. Furthermore, selective grinding by fluidized bed opposed jet mills during the processing of foundry sand (to separate water glass bond or resin cement from the sand) and the cleaning of metal alloys (to separate mineral or ceramic contaminants from the main alloy) are known.

An object of the present invention is to provide processes for manufacturing high yields of higher purity psyllium seed husk. A further object is to provide processes for purifying impure psyllium seed husk. An additional object is to provide processes for making very fine particle size, high purity psyllium seed husk from impure psyllium seed husk (especially impure husk having about 95% or less purity). An additional object is to provide psyllium-containing products having better flavor, less grit, and/or lighter color comprising sized psyllium seed husk prepared by a process of the present invention.

These and other objects of the present invention will become readily apparent from the detailed description which follows.

All percentages and ratios used herein are by weight unless otherwise specified.

SUMMARY OF THE INVENTION

The present invention relates to processes for selectively comminuting psyllium seed husk. These processes comprise the steps of: (a) milling impure psyllium seed husk in a mill which causes the husk to be fragmented by collision under conditions whereby the mean particle size of the husk material is reduced relatively more than the mean particle size of the non-husk impurity; and (b) collecting the selectively comminuted psyllium seed husk. Preferred selectively comminuted psyllium seed husk has at least about 75% of its particle size passing through 80 mesh screen.

The present invention also relates to processes for purifying psyllium seed husk. These processes comprise the steps of: (a) dividing selectively comminuted psyllium seed husk, prepared by a process wherein impure psyllium seed husk is milled in a mill which causes the husk to be fragmented by collision, into one or more fragments enriched with non-husk material and one or more fragments reduced in non-husk material; and (b) separating the fragments. Preferred processes for purifying impure psyllium seed husk comprise the steps of: (1) milling impure psyllium seed husk (especially psyllium seed husk having about 95% or less purity) in a mill which causes the husk to be fragmented by collision under conditions whereby the mean particle size of the husk material is reduced relatively more than the mean particle size of the nonhusk impurity; and (2) dividing the selectively comminuted psyllium seed husk into one or more fragments enriched with non-husk material and one or more fragments reduced in non-husk material.

Finally, this invention relates to psyllium prepared by processes of the present invention; and to psyllium-containing products comprising (a) psyllium husk prepared by a process of the present invention and (b) a carrier suitable for oral administration to a human. Preferred are psyllium-containing products in solid form suitable for dispersion in a liquid to form an ingestible drink.

DETAILED DESCRIPTION OF THE INVENTION

1. Selective Comminution of Seed Husk

It has been surprisingly discovered, as described herein, that psyllium seed husk can be selectively comminuted. This may be achieved by using processes comprising milling impure psyllium seed husk in a mill which causes the psyllium husk to be fragmented by collision under conditions whereby the mean particle size of the husk material is reduced relatively more than the mean particle size of the non-husk impurity. In contrast to the art-known methods of grinding or milling seed husk solely by crushing the seed husk (e.g., between plates or rollers) or "slicing" the husk (e.g., by cutting, scissoring, abrading, or shearing against sharp blades, screens, grates, etc.), it is possible to selectively reduce the particle size of psyllium seed husk relative to non-husk material impurities by using the milling process of the present invention.

As noted hereinbefore, mills suitable for the selective comminution processes of the present invention are known. Generally, they are characterized as being mills which produce fragmentation (i.e., the "milling") of the material solely or predominantly through collision, including particle-particle collision and/or particle-blunt surface collision, rather than having the fragmentation being caused by solely a crushing or slicing action.

An example of one type of mill suitable for the process of the present invention is known as "stud mills" (also known as "pin mills"). Stud mills are generally described as mills which grind by impact of the material against round pins or "studs" which are moving at high speed. These pins are located in rows forming concentric circles. Several concentric circles of pins are placed on a rotor. These rotor pins are additionally placed concentric a similar arrangement on a stator or second rotor. In the two rotor arrangement, they rotate in opposite directions. Material passing through the zone of rotating pins is subjected to many collisions with the pins and with other particles, thereby resulting in size reduction.

Commercially available stud mills include Kolloplex ® Stud Mills (one rotating, one stationery stud disc; sold by Alpine American Corp., Natick, MA.) and Contraplex ® Stud Mills (two rotating stud discs; also sold by Alpine American Corp., Natick, MA.). Specific examples include the Kolloplex ® Stud Mills Type 250Z, 400Z, and 630Z; the Kolloplex ® Laboratory Mill 160Z; the Contraplex ® Stud Mills Type 250CW, 400CW, 630C, 710CW, and 1120CW; and the Contraplex ® Laboratory Mill 63C. These stud mills are described in more detail in Leaflet 10-11/3e (titled "Modern Stud Mills") available from Alpine American Corp. and incorporated by reference herein in its entirety.

An example of another type of mill useful for the process of the present invention is fluid energy mills. These mills generally operate by the process of particle-particle collisions. Material to be ground is introduced into the mill through a venturi feeder. The material contacts air, steam, or other gas moving at sonic and supersonic velocities. This causes the particles to be accelerated and to collide with other particles, and size reduction occurs. The particles are carried out with the exit air and/or collected in batches.

Commercially available fluid energy mills include Fluidized Bed Opposed Jet Mills (sold by Alpine American Corp., Natick, MA.). Specific examples include the Fluidized Bed Jet Mills 100AFG, 200AFG, 400AFG, 630AFG, 800AFG, and 1250AFG, all sold by Alpine American Corp. These fluidized bed mills are described in more detail in Leaflet 21/1US (titled "Fluidized Bed Opposed Jet Mills AFG") available from Alpine American Corp. and incorporated by reference herein in its entirety.

An example of another type of mill useful for the process of the present invention is "ball mills" (also known as "pot mills" or "jar mills"). These mills generally operate by the process of attrition and impact, the milling being effected by placing the substance in jars or cylindrical vessels, lined with porcelain or a similar hard substance and containing "pebbles" or "balls" of flint, porcelain, steel, or stainless steel. These cylindrical vessels revolve horizontally on their long axis and the tumbling of the pebbles or balls over one another and against the sides of the cylinder effects comminution. A variation of this type of mill is the "vibrating ball mills", which also combine attrition and impact, consisting of a mill shell containing a charge of balls similar to the previously described ball mills. However, these mills vibrate the shell rather than rotate. Commercially available vibrating ball mills include the Sweco Vibro Energy Grinding Mill Model DM1.

The specific milling conditions (e.g., feed rate of husk into the mill; pin density; rpm of the mill) for selectively comminuting the husk is expected to vary according to the type of psyllium husk being processed, the size of the psyllium husk being milled, and the specific piece of equipment being utilized. Optimization of the process can be readily achieved by simple experimentation and evaluation of the degree of selectivity achieved for husk and non-husk particle size reduction with each experiment through simple evaluation of particle size distribution before and after the process run. Evaluation is most easily achieved by sifting the psyllium husk through a series of different size mesh screens, evaluating the percent of material retained on each screen, and qualitatively (e.g., visually) or quantitatively identifying the process conditions whereby the mean particle size of the husk material is reduced relatively more than the mean particle size of the non-husk material, as indicated by optimized separation of impurity from the pure seed husk. Therefore, selection of the process conditions whereby the mean particle size of the husk material is reduced relatively more than the mean particle size of the non-husk impurity are readily made by one skilled in the art.

Impure psyllium seed husk which may be selectively comminuted by the processes herein include raw psyllium seed husk (i.e., the husk obtained by separating the seed husk from the remainder of the seed by slight mechanical pressure), and psyllium seed husk which has been processed to reduce its particle size (including previously milling the husk by a process of the present invention). Preferred psyllium seed husk to be selectively comminuted according to the present invention is impure raw psyllium seed husk having at least about 50% of the psyllium seed not pass through 60 mesh screen. The psyllium seed husk is preferably milled until at least about 50% of the psyllium seed husk passes through 60 mesh screen, more preferably at least about 75% through 80 mesh screen. (Particle sizes and particle size distributions may be readily determined by one of ordinary skill in the art, for example by sieving using an Alpine Laboratory Air Jet Sieve, Type 200 LS, sold by Alpine American Corp.).

Impurity present in the impure psyllium seed husk is any non-husk material, typically non-husk psyllium seed particles. Furthermore, impurities include the particularly objectionable dark colored impurities present in impure psyllium seed husk, and it is therefore especially desirable to remove these impurities by the processes of the present invention. The purity of impure psyllium seed husk may be readily quantitatively determined by the USP method for measuring psyllium husk light and heavy components as described in *The United States Pharmacopoeia*, Twenty-First Revision, United States Pharmacopcoeial Convention, Inc. (1984), page 915, incorporated by reference herein in its entirety. Visual inspection of the amount of dark materials present in the psyllium husk is an easy qualitative measure of purity. Impure psyllium seed husk for use in the present processes typically is less than about 99% pure, more typically less than about 98% pure, and most typically about 95% or less pure.

Following the selective comminution of the impure psyllium seed husk, the milled husk may be collected, preferably to be used after subsequent purification. In addition, instead of collecting the milled husk, it may be used in a purification process as described hereinafter.

2. Processes for Purifying Psyllium Seed Husk

The present invention further relates to processes for purifying psyllium seed husk. This includes processes comprising the steps of: (a) dividing selectively comminuted psyllium seed husk, prepared by a process as described hereinbefore wherein psyllium seed husk is milled in a mill which causes the husk to be fragmented by collision, into one or more fragments enriched with non-husk material and one or more fragments reduced in non-husk material; and (b) separating the fragments.

Purification of psyllium seed husk may also be achieved by processes comprising the steps of: (a) milling impure psyllium seed husk, to selectively comminute the psyllium seed husk, in a mill which causes the husk to be fragmented by collision under conditions whereby the mean particle size of the husk material is reduced relatively more than the mean particle size of the nonhusk material; and (b) dividing the selectively comminuted psyllium seed husk into one or more fragments enriched with non-husk material and one or more fragments reduced in non-husk material. Preferred are purification processes wherein the milling is performed by a stud mill. Also preferred are processes wherein the particle size of the impure psyllium seed husk to be milled has at least about 50% of particles which do not pass through 60 mesh screen, and are milled until at least about 50% of the psyllium seed husk passes through 60 mesh screen (more preferably at least about 75% through 80 mesh screen). Preferably at least one fragment reduced in non-husk material is greater than 95% pure, and more preferably at least 98% pure.

Division of the husk in the fragments enriched and reduced in non-husk material typically is achieved by procedures which divide material on the basis of density and/or size. Examples of such procedures include sieving through screens and distribution on gravity tables; or combinations of division methods may be used (e.g., a combination of screening and gravity tables). The dividing of the psyllium seed husk into fragments includes, for example, a gradiant distribution of husk and impurity, whereby the fragments of husk enriched and reduced in impurity form a continuum (from most reduced to most enriched), and this continuum is subsequently separated to collect the desired fragments (e.g., separating the end of the gradient continuum enriched in impurity from the end reduced in impurity). The dividing of the psyllium seed husk also includes, for example, methods which result in separation along with the division (e.g., as occurs by sieving). The choice of methods used to divide and separate selectively comminuted psyllium seed husk may be readily made by one of ordinary skill in the art by taking advantage of the differences in the particle distribution of the seed husk and the impurity. Preferred is division by sieving through a screen having 60 mesh or larger openings.

3. Psyllium-Containing Products

The present invention also relates to psyllium-containing products. These products comprise psyllium husk prepared by a process according to the present invention and one or more carrier materials suitable for oral administration to a human. Preferably these products comprise from about 1% to about 99% psyllium husk and from about 1% to about 99% carrier materials; and more preferably frqm about 10% to about 98% psyllium husk and from about 2% to about 90% carrier material.

The carrier materials useful for the products of the present invention must be safe for oral administration to humans, and may be chosen by one of ordinary skill in the art as appropriate for the form and use intended for the product. Psyllium-containing product forms, methods for making, and carrier materials useful for these products, are described more fully, for example, in U.S. Pat. No. 4,459,280, to Colliopoulos et al., issued July 10, 1984; U.S Pat. No. 4,548,806, to Colliopoulos et al., issued Oct. 22, 1985; and U.S. Pat. No. 4,321,263, to Powell, et al., issued March 23, 1982; all of which are incorporated by reference herein in
their entirety.

Most preferred are products of the present invention in dry powder form suitable for mixing in a liquid (typically water) to form a psyllium-containing drink. Preferred carrier materials for such powder forms are known and are described in detail in, for example, U.S. Pat. Nos. 4,459,280, and 4,548,806, incorporated hereinbefore by reference. Preferred are such powders (preferably sugar free) comprising maltodextrin, and especially powders comprising agglomerates of psyllium and/or coated psyllium, especially agglomerated with maltodextrin.

Psyllium-containing powders suitable for mixing in a liquid comprising from about 10% to about 98% of psyllium husk prepared by a process of the present invention (more preferably from about 20% to about 95% psyllium husk), and from about 0% to about 60% maltodextrin (more preferably from about 2% to about 50% maltodextrin) are preferred. Psyllium-containing products according to the present invention containing sugar (e.g., sucrose) comprise from about 10% to about 60% (preferably from about 20% to about 55%) psyllium husk, from about 35% to about 90% sugar, and from about 0% to about 5% maltodextrin. Sugar free products typically comprise from about 40% to about 98% (preferably from about 50% to about 95%) of psyllium husk according to the present invention, and from about 1% to about 60% (preferably from about 2% to about 50%) of maltodextrin. Preferred compositions comprise agglomerated psyllium, and also preferred are compositions wherein the carrier material comprises citric acid.

The following Example further describes and demonstrates an embodiment within the scope of the present invention. The Example is given solely for the purpose of illustration and is not to be construed as limitations of the present invention as many variations thereof are possible without departing from the spirit and scope.

EXAMPLE 1

Selectively Comminuting and Purifying Psyllium Husk

Raw blond psyllium husk [95% purity; ethylene oxide sanitized; particle size distribution approximately: on 20 mesh (841 microns) =4.6%, thru 20 on 40 mesh (420 microns) =62.6%, thru 40 on 60 mesh (250 microns) =23.1%, thru 60 on 100 mesh (149 microns) TM 7.2%, thru 100 on 140 mesh (105 microns) =1.4%, thru 140 on 200 mesh (74 microns) =0.7%, thru 200 mesh (<74 microns) =0.4%]is selectively comminuted by using an Alpine Pin Mill (Model No. 160 UPZ; flow rate - 70 kz/hr; full pin density; 18,000 rpms; sold by Alpine American Corp., Natick, MA.) to maximize the through 80 mesh on 200 mesh fraction. The comminuted psyllium husk obtained has approximately the following particle size distribution; on 80 mesh (>177 microns) =15%; thru 80 on 100 mesh (177-149 microns) =2.5%; thru 100 on 120 mesh (149-125 microns) =14.2%; thru 120 on 140 mesh (125-105 microns) =14.9%; thru 140 on 170 mesh (105-95 microns) =17.7%; thru 170 on 200 =16.0%; thru 200 on 325 mesh (74-44 microns) mesh (95-74 microns) =16.0%; thru 200 on 325 mesh (74-44 microns) =11.2%; and thru 325 mesh (<44 microns) =8.5%.

The selectively comminuted psyllium husk is purified by sifting over a 60 mesh screen to sieve out much of the dark material, and then sieved to collect through 80 on 200 mesh particle size psyllium husk. This psyllium is then used to prepare the following product prepared by dry mixing the ingredients in a Hobart mixer (Model No. N-50).

| Ingredient | Percent of Formula |
| --- | --- |
| Sucrose | 63.43 |
| Citric Acid | 2.54 |
| Orange Flavor | 1.59 |
| Psyllium | 32.35 |
| FD&C Yellow No. 6 | 0.10 |

One tablespoon of this product is dispersed in 8 oz. of water to produce a drink containing approximately 5.1 grams of psyllium. Consumption of this drink by a human is effective for providing laxation benefits.

Use of the psyllium prepared by this selective comminution and purification process produces products which are noticeably different from products prepared using psyllium comminuted indiscriminately with, for example, a hammer mill. Products prepared by selective comminution are generally characterized by having better flavor, less gritty texture, and lighter color than products prepared using psyllium from an indiscriminate milling process.

What is claimed:

1. A process for purifying impure psyllium seed husk, wherein said impure psyllium seed husk comprises psyllium seed husk previously separated from intact psyllium seeds and non-husk material, and wherein further said impurs psyllium seed husk does not include intact psyllium seeds, said process comprising the steps of (a) milling said impure psyllium seed husk in a mill which causes the husk and non-husk material to be fragmented by collision under conditions whereby the mean particle size of the husk material is reduced relatively more than the mean particle size of the non-husk material, (b) separating the milled impure psyllium seed husk into at least one fragment enriched with non-husk material and at least one material psyllium seed husk fragment reduced in non-husk material, and (c) collecting the pruified psyllium seed husk.

2. A process for purifying impure psyllium seed husk according to claim 1 comprising milling impure psyllium seed husk in a stud mill.

3. A process for purifying impure psyllium seed husk according to claim 2 comprising milling impure psyllium seed husk having at least about 50% of particles which do not pass through 60 mesh screen until at least about 50% of the psyllium husk material passes through 60 mesh screen.

4. A process for purifying impure psyllium seed husk according to claim 3 comprising milling impure psyllium seed husk less than about 95% pure until at least about 75% of the psyllium seed husk passes through 80 mesh screen.

5. A process for purifying impure psyllium seed husk according to claim 1 comprising milling impure psyllium seed husk in a fluid energy mill.

6. A process for purifying impure psyllium seed husk according to claim 1 comprising milling impure psyllium seed husk in a ball mill.

7. A process for purifying impure psyllium seed husk according to claim 1 wherein in step (b) the milled impured psyllium seed husk is separated by sieving.

8. A process for purifying impure psyllium seed husk according to claim 7 wherein the imprue psyllium seed husk is sieved through a screen having a larger than about 60 mesh openings.

9. A process for purifying impure psyllium seed husk according to claim 1 wherein in step (b) the milled impure psyllium seed husk is separated by using a gravity table.

10. A process for purifying impure psyllium seed husk according to claim 1 comprising milling impure psyllium seed husk having at least about 50% of particles which do not pass through 60 mesh screen until at least about 50% of the psyllium husk material passes through 60 mesh screen.

11. A process for purifying impure psyllium seed husk according to claim 1 comprising the steps of:
(a) milling impure psyllium seed husk having less than about 95% purity and having at least about 50% of particles which do not pass through 60 mesh screen in a stud mill under conditions whereby the mean particle size of the husk material is reduced relatively more than the mean particle size of the non-husk material until at least about 75% of the psyllium seed husk passes through 80 mesh screen; and
(b) separating the milled impure psyllium seed husk into at least one fragment enriched with non-husk material and at least one purified psyllium seed husk fragment reduced in non-husk material which is at least about 98% pure; and
(c) collecting the purified psyllium seed husk having at least about 98% purity.

* * * * *